United States Patent
Sassone et al.

(10) Patent No.: US 9,304,932 B2
(45) Date of Patent: Apr. 5, 2016

(54) INSTRUCTION CACHE HAVING A MULTI-BIT WAY PREDICTION MASK

(71) Applicant: QUALCOMM Incorporated, San Diego, CA (US)

(72) Inventors: Peter G. Sassone, Austin, TX (US); Suresh K. Venkumahanti, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 13/721,317

(22) Filed: Dec. 20, 2012

(65) Prior Publication Data

US 2014/0181405 A1 Jun. 26, 2014

(51) Int. Cl.
G06F 12/00 (2006.01)
G06F 12/08 (2006.01)
G06F 9/38 (2006.01)

(52) U.S. Cl.
CPC .......... *G06F 12/0875* (2013.01); *G06F 9/3802* (2013.01); *G06F 9/3806* (2013.01); *G06F 9/3832* (2013.01); *G06F 12/0864* (2013.01); *G06F 2212/6082* (2013.01); *Y02B 60/1225* (2013.01)

(58) Field of Classification Search
CPC ............................. G06F 12/864; G06F 12/864
USPC .......................................................... 711/125
See application file for complete search history.

(56) References Cited

U.S. PATENT DOCUMENTS

| | | | |
|---|---|---|---|
| 5,142,633 A | 8/1992 | Murray et al. | |
| 5,287,467 A | 2/1994 | Blaner et al. | |
| 5,781,789 A * | 7/1998 | Narayan | 712/23 |
| 5,794,028 A * | 8/1998 | Tran | 712/240 |
| 5,845,102 A * | 12/1998 | Miller et al. | 712/211 |
| 5,848,433 A * | 12/1998 | Tran et al. | 711/137 |
| 5,935,239 A | 8/1999 | Narayan | |
| 5,961,638 A * | 10/1999 | Tran | 712/239 |
| 6,356,990 B1 | 3/2002 | Aoki et al. | |
| 6,691,221 B2 | 2/2004 | Joshi et al. | |
| 7,085,920 B2 | 8/2006 | Yoshimi | |
| 8,151,084 B2 * | 4/2012 | Caprioli | G06F 12/0864 711/118 |
| 2005/0050278 A1 | 3/2005 | Meier et al. | |
| 2005/0246499 A1 | 11/2005 | Saida et al. | |
| 2008/0082753 A1 | 4/2008 | Licht et al. | |
| 2008/0147989 A1 * | 6/2008 | Williams III | G06F 12/126 711/145 |
| 2011/0231719 A1 * | 9/2011 | Kim | G01R 31/318533 714/729 |

OTHER PUBLICATIONS

International Search Report and Written Opinion—PCT/US2013/077020—ISA/EPO—May 8, 2014.

* cited by examiner

*Primary Examiner* — Prasith Thammavong
(74) *Attorney, Agent, or Firm* — Peter Michael Kamarchik; Paul Holdaway

(57) ABSTRACT

In a particular embodiment, an apparatus includes control logic configured to selectively set bits of a multi-bit way prediction mask based on a prediction mask value. The control logic is associated with an instruction cache including a data array. A subset of line drivers of the data array is enabled responsive to the multi-bit way prediction mask. The subset of line drivers includes multiple line drivers.

24 Claims, 6 Drawing Sheets

US 9,304,932 B2

INSTRUCTION CACHE HAVING A MULTI-BIT WAY PREDICTION MASK

I. FIELD OF DISCLOSURE

The present disclosure is generally directed to an instruction cache memory system.

II. BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Such computing capabilities may be enhanced via a processor that includes an instruction cache (icache) that is configured to store (in a cache line) recently or frequently executed program instructions. Instructions stored in the instruction cache may be accessed by the processor more quickly than instructions accessed from a main memory. The instruction cache includes a plurality of ways that each include a driver that corresponds to one or more cache lines (e.g., storage locations) of the instruction cache. To access a particular instruction stored in the instruction cache, all drivers may be enabled (e.g., activated) to drive (via a plurality of data lines) all the ways to a multiplexer, and the desired way may be selected by the multiplexer. However, driving all the ways for each instruction cache access expends power to drive each way, even though only a single way is ultimately selected.

To reduce power consumption, way prediction techniques have been used to predict (e.g., identify) a "next way" to be driven and thus a next cache line (e.g., instruction(s)) to be executed. By predicting the "next way" (i.e., a location of the next instruction to be executed), only a single way needs to be driven. However, previous way prediction techniques are susceptible to frequent misprediction (e.g., predicting an incorrect way) which results in a performance loss and a power penalty experienced by the processor to correct the misprediction and access the correct next way.

For example, a first technique stores the last (previous) "next way" for each cache line (i.e., a single "next way"). Based on the single "next way", the instruction cache enables a single driver that corresponds to the single "next way." When the correct way is not driven (i.e., not provided to the multiplexer), a misprediction occurs and a second access to the instruction cache data array is performed that drives the correct way (based on a completed tag lookup operation or a signal provided from control logic). When using the first technique, accuracy of predicting the correct "next way" is an issue because predictability of a given program (e.g., multiple instructions) may be erratic. Accordingly, the last "next way" for a cache line is not necessarily a good predictor and frequent mispredictions occur.

A second technique assigns a confidence value to a way prediction to decide whether the way prediction is likely to result in selecting (i.e., identifying) the correct way. If the confidence value for a single way prediction is not high enough, all of the drivers are enabled. A third technique stores a predicted "next way" in a branch target buffer (e.g., a trace cache) to be used when a branch type instruction is identified. The stored predicted "next way" may have a high accuracy rate, but branches may not be taken very often and thus the third technique is only useful in situations where a branch is taken after execution of a current instruction.

III. SUMMARY

A way prediction technique for an instruction cache (icache) that utilizes a multi-bit way prediction mask (e.g., a prediction mask value) that corresponds to a last cache line fetched (and executed) is disclosed. The multi-bit way prediction mask may provide "next way" predictions with respect to the last cache line fetched. The multi-bit way prediction mask may include an n-bit vector where each bit corresponds to a way of the instruction cache. For example, when the instruction cache includes four ways, the multi-bit way prediction mask may include a 4-bit value. Each of the corresponding ways may include a driver (e.g., a line driver) that is enabled or disabled based on the multi-bit way prediction mask. Multi-bit way prediction mask values that are each associated with a corresponding cache location may be stored in any structure that has a one-to-one association with the cache lines of the instruction cache. For example, the multi-bit way prediction mask of a particular cache line may be stored in a tag array, a register corresponding to a cache line, or as part of (e.g., at the end of) the most recently fetched cache line.

In a particular embodiment, an apparatus includes control logic configured to selectively set bits of a multi-bit way prediction mask based on a prediction mask value. The control logic is associated with an instruction cache including a data array. A subset of line drivers of the data array is enabled responsive to the multi-bit way prediction mask. The subset of line drivers includes multiple line drivers.

In another particular embodiment, a method includes selectively setting bits of a multi-bit way prediction mask based on a prediction mask value. The multi-bit way prediction mask is associated with an instruction cache including a data array having a plurality of line drivers. A subset of line drivers of the data array is enabled responsive to the multi-bit way prediction mask. The subset of line drivers includes multiple line drivers.

In a further particular embodiment, an apparatus includes means for selectively setting bits of a multi-bit way prediction mask based on a prediction mask value. The multi-bit way prediction mask is associated with an instruction cache including a data array. The apparatus also includes means for providing the multi-bit way prediction mask to a plurality of line drivers of the data array. Multiple line drivers of the plurality of line drivers are enabled responsive to the multi-bit way prediction mask.

In another particular embodiment, a non-transitory computer readable medium includes instructions that, when executed by a processor, cause the processor to selectively set bits of a multi-bit way prediction mask according to a prediction mask value. The multi-bit way prediction mask is associated with an instruction cache including a data array. Multiple line drivers of the data array are enabled responsive to the multi-bit way prediction mask.

One particular advantage provided by disclosed embodiments is a way prediction technique that reduces low power consumption, has high prediction accuracy, and overcomes deficiencies of previous way prediction techniques. The way prediction technique reduces or avoids mispredictions that affect both power efficiency and processor performance. A rate of misprediction occurrence for an instruction cache may be greatly reduced as compared to previous way prediction techniques (e.g., less than 1%).

Other aspects, advantages, and features of the present disclosure will become apparent after review of the application, including the following sections: Brief Description of the Drawings, Detailed Description, and the Claims.

IV. BRIEF DESCRIPTION OF THE DRAWINGS

FIG. 1 is a block diagram of a first illustrative embodiment of a processor system including an instruction cache that utilizes a prediction mask;

FIG. 2 a block diagram of a second illustrative embodiment of a processor system including an instruction cache that utilizes a prediction mask;

V. DETAILED DESCRIPTION

Figure 1:
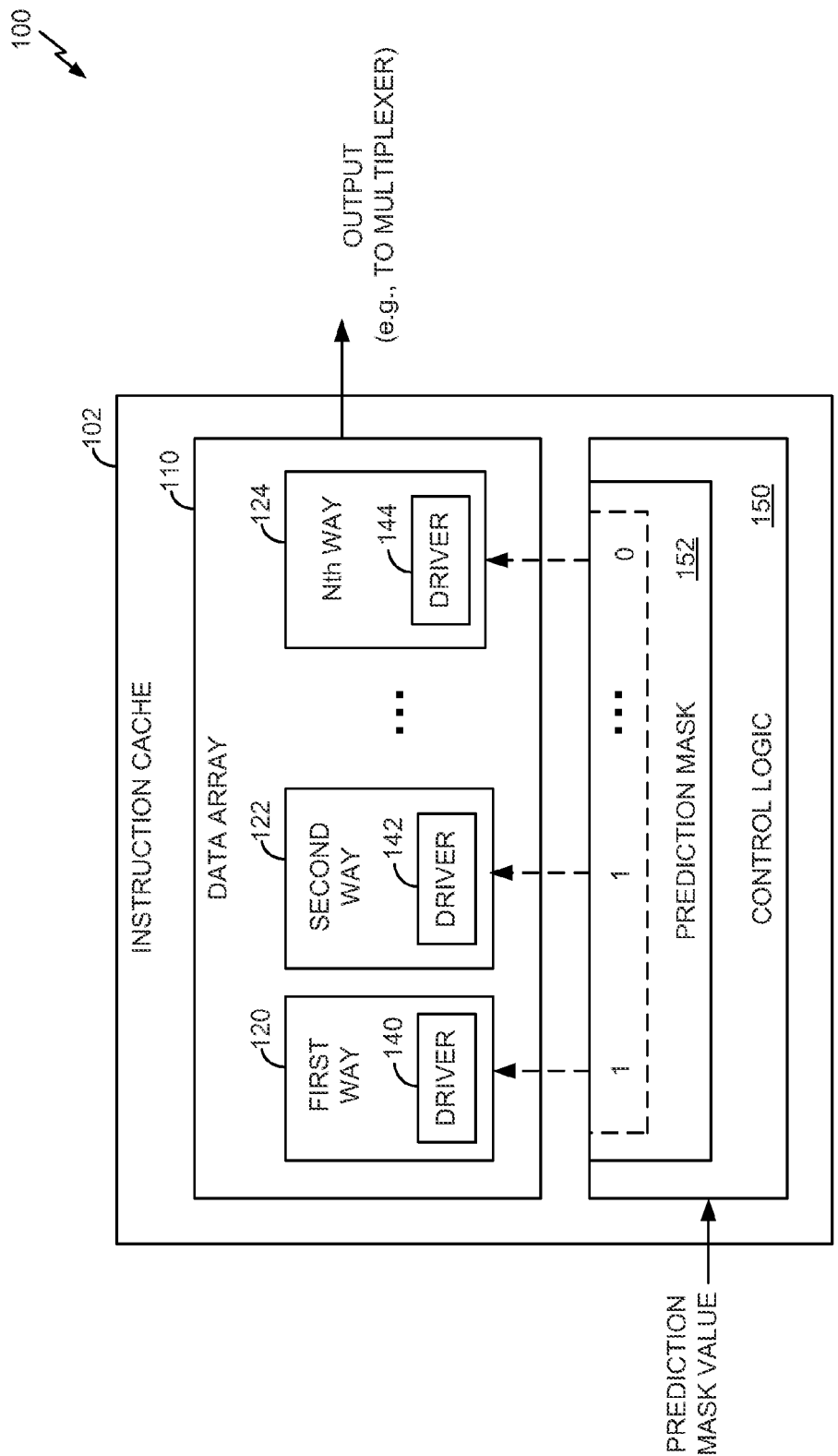

FIG. 1 illustrates a first particular illustrative embodiment of a processor system 100 that includes an instruction cache 102 (e.g., an icache). The instruction cache 102 may be configured to store (in a cache line) recently or frequently executed program instructions. Instructions stored in the instruction cache 102 may be accessed more quickly than instructions accessed from another location, such as a main memory (not shown). In a particular embodiment, the instruction cache 102 is a set-associative cache. The instruction cache 102 includes a data array 110 and control logic 150.

The data array 110 may include a plurality of ways 120-124 that each include a corresponding line driver 140-144. Each line driver 140-144 corresponds to a way (e.g., a column of the data array 110) that includes multiple cache lines (e.g., storage locations) of the data array 110. The data array 110 may include a first way 120 having a first line driver 140, a second way 122 having a second line driver 142, and an Nth way 124 having an Nth line driver 144. Although three line drivers 140-144 are shown in FIG. 1, less than three or more than three line drivers may be included in the data array 110. In a particular embodiment, the data array 110 includes four ways. Each of the line drivers 140-144 may be coupled to a corresponding data line (not shown) via which each line driver 140-144 drives content (e.g., data of a cache line of the data array 110) associated with a corresponding way 120-124. For example, the line driver 140 may drive content (e.g., data, such as one or more instructions, stored at a cache line) associated with the first way 120. In a particular embodiment, the line drivers 140-144 drive the contents of the ways 120-124 as an output of the data array 110 to a multiplexer (not shown). The multiplexer may be responsive to the plurality of line drivers 140-144 and may be configured to select a particular way (e.g., a desired way). In a particular embodiment, the data array 110 may include the multiplexer.

The control logic 150 may include or have access to a prediction mask 152 (e.g., a multi-bit way prediction mask) that provides "next way" predictions to the data array 110. The "next way" predictions may be associated with a last cache line fetched (e.g., a last cache line of the data array 110 that was accessed) and predict (e.g., identify) a "next way" to be driven and thus a next cache line to be accessed (e.g., a next instruction to be executed). By predicting one or more "next ways" (but not all of the ways 120-124), less than all of the line drivers 140-144 of the instruction cache 102 are driven (e.g., have corresponding drivers enabled) which results in reduced power usage than enabling all of the drivers 140-144 to drive all of the ways 120-124. A value (e.g., a prediction mask value) of the prediction mask 152 may correspond to the last cache line fetched of the instruction cache 102 to predict the one or more next ways. The prediction mask 152 may include an n-bit vector where each bit corresponds to a particular way of the instruction cache 102. The prediction mask 152 may be stored in a register or a buffer.

The control logic 150 may be configured to selectively set one or more bits of the prediction mask 152 based on (e.g., according to) a prediction mask value associated with the last cache line fetched. The prediction mask 152 may enable (or disable) a subset of line drivers of the data array 110, such as one or more of the drivers 140-144. When multiple bits of the prediction mask 152 are set, a corresponding number of the plurality of drivers 140-144 is enabled (or disabled). Each of the plurality of drivers 140-144 may be selectively enabled (e.g., turned on or activated) or selectively disabled (e.g., turned off or deactivated) by a particular bit of the prediction mask 152. In a particular embodiment, the subset of line drivers is greater than one line driver (e.g., the prediction mask 152 has multiple bits set and concurrently enables multiple line drivers).

The control logic 150 may be configured to maintain a plurality of prediction mask values that each correspond to a cache line of the data array 110. The plurality of prediction mask values may be stored at one or more storage locations accessible to the control logic 150. For example, one or more of the prediction mask values may be stored in a tag array, a register associated with cache lines of the data array 110, as part of the respective cache lines, or in a structure that has a one-to-one association with the cache lines of the data array 110. When contents are loaded into a particular cache line of the data array 110, the control logic 150 may set (e.g., initialize) a particular prediction mask value corresponding to the particular cache line to an initial value. Additionally, the control logic 150 may update other prediction mask values as necessary to reflect the contents being loaded into the particular cache line. For example, the control logic 150 may update a prediction mask value corresponding to another cache line that identified a way associated with the previous contents of the particular cache line as a "next way," to indicate that the way is no longer identified as a "next way" of the other cache line.

The control logic 150 may receive a prediction mask value associated with a cache line of the data array 110 that was last fetched (e.g., most recently fetched). The prediction mask value may predict (e.g., identify) one or more ways to be accessed after the last cache line was fetched. The one or more ways to be accessed may each correspond to a cache line that stores one or more instructions to be executed after an instruction(s) corresponding to the last cache line fetched. The control logic 150 may set the prediction mask 152 based on the prediction mask value. For example, when a particular cache line of the data array 110 is accessed, the prediction mask value corresponding to the particular cache line may be identified and set as the value of the prediction mask 152 to identify one or more "predicted" ways to be driven during a next cache access after the particular cache line is accessed. The prediction mask 152 may be provided to the data array 110 to selectively enable and/or disable one or more of the drivers 140-144 based on the prediction mask. The drivers 140-144 that are enabled (e.g., turned on) or disabled (e.g., turned off) as a result of the prediction mask 152 may provide (e.g., drive) contents (e.g., instructions) of cache lines corresponding to the enabled drivers 140-144, such as to an output multiplexer, as discussed in further detail with respect to FIG. 2. In a particular embodiment, the instruction associated with the last cache line fetched is executed concurrently with the prediction mask value of the last cache line fetched being provided to the data array 110.

The control logic 150 (or other component of the instruction cache 102, such as a multiplexer) may determine whether the contents provided via the enabled drivers 140-144 includes one or more instruction to be executed next (e.g., after the instruction(s) corresponding to the last cache line fetched). If the ways enabled according to the prediction mask 152 set to the prediction mask value do not provide the one or more instructions to be executed next (e.g., the prediction mask does not predict a correct next way to be driven), a misprediction occurs. In a particular embodiment, the control logic 150 determines whether a misprediction occurs based on whether or not a multiplexer selects an output of the data array 110 that corresponds to a predicted way identified by the prediction mask 152.

The control logic 150 may also maintain the plurality of prediction mask values by determining whether a misprediction occurred based on the prediction mask 152 (e.g., a particular prediction mask value) being provided to the data array 110 to enable one or more of the drivers 140-144. When the particular prediction mask value is applied to the data array 110, the control logic 150 may determine whether a misprediction occurred based on the particular prediction mask value. When a determination is made that a misprediction has occurred, one or more of the line drivers 140-144 that were not previously enabled may subsequently be enabled to provide a correct way output to recover from the misprediction. In a particular embodiment, all of the line drivers 140-144 are enabled after the misprediction.

The control logic 150 may identify the correct way accessed (e.g., driven) and update, based on the correct way, the prediction mask value that caused the misprediction. For example, the control logic 150 may identify the correct way as a successive way after the cache line (e.g., a way) associated with the prediction mask value is accessed. In a particular embodiment, recovering from the misprediction may include accessing another storage location (e.g., a main memory) other than the instruction cache 102 to obtain an instruction to be executed after the instruction(s) associated with the last cache line fetched. When the instruction is obtained (e.g., fetched) from the other storage location, the instruction may be loaded (e.g., stored) into a cache line associated with a particular way 120-124 of data array 110. The control logic 150 may identify the particular way as a successor way and update the prediction mask value based on the identified particular way. The control logic 150 may update the prediction mask value that caused the misprediction by setting a bit of the prediction mask value that corresponds to the successive cache line accessed. Accordingly, if the prediction mask value fails to successfully predict a successive way, the prediction mask value is updated so that, when the cache line is next accessed, the successive way is predicted as a "next way" (e.g., a successor way).

During operation, the control logic 150 may receive an instruction address associated with an instruction stored in a cache line (e.g., a way) of the data array 110. Based on the instruction address, the control logic 150 may identify a particular prediction mask value associated with the instruction address. For example, the control logic 150 may identify the particular prediction mask value from the plurality of prediction mask values that each correspond to a cache line of the data array 110. After the particular prediction mask value is identified, the control logic 150 may set one or more bits of the prediction mask 152 based on the particular prediction mask value identified so that value of the prediction mask 152 is the same value as the particular prediction mask value. The control logic 150 may provide the prediction mask 152 (e.g., the multi-bit way prediction mask) to the data array 110 (e.g., the line drivers 140-144) after the cache line associated with the instruction address is fetched. Each respective bit of the prediction mask 152 that corresponds to a particular line driver 140-144 may be received at an input of the particular line driver 140-144 to enable or disable the particular line driver based on a value (e.g., a data value) received at the input of the particular line driver 140-144.

The data array 110 may receive the prediction mask 152 and a subset of line drivers 140-144 of the data array 110 may be selectively enabled based on the received prediction mask 152. For example, a particular line driver 140-144 may receive a bit of the prediction mask 152 that corresponds to the particular line driver 140-144. The data array 110 may provide contents (e.g., at least a portion of a cache line) of a way corresponding to each enabled driver of the subset of line drivers 140-144 as an output of the data array 110. The contents provided as the output of the data array 110 may represent ways that are predicted to be a next way accessed after the cache line associated with the instruction address is fetched.

By selectively enabling a subset of the plurality of drivers 140-144 and driving more than one predicted way (but not all of the ways), a power benefit may be realized on each data access of the instruction cache 102. Additionally, using the way prediction technique described above, a misprediction should only occur once for each successor way because, after a misprediction, a bit of the multi-bit way prediction mask 152 is updated to identify the particular cache line as a successor.

Figure 2:
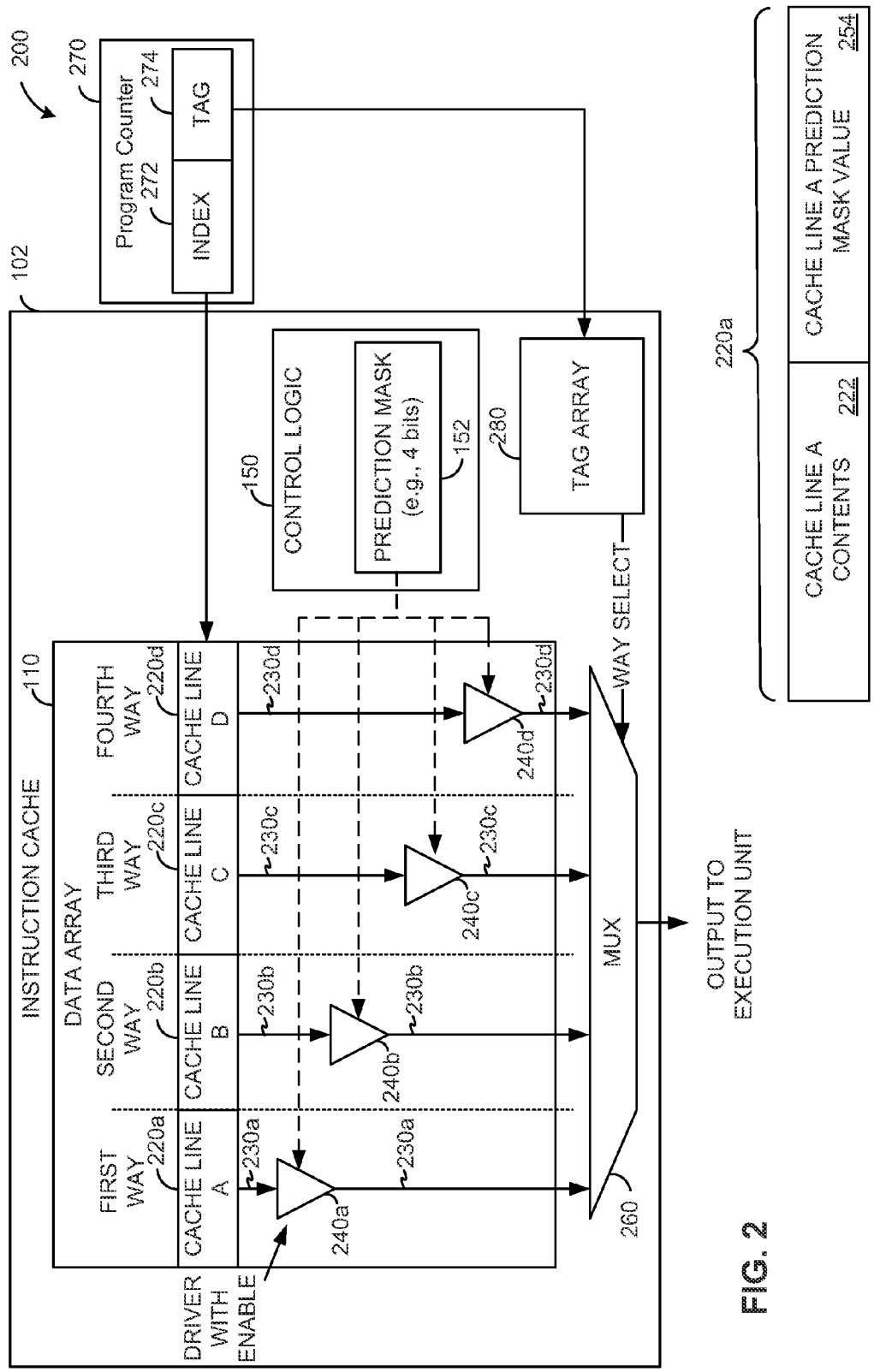

Referring to FIG. 2, a processor system 200 that utilizes a multi-bit prediction mask is disclosed. The processor system 200 may include a program counter 270 and the instruction cache (icache) 102. The processor system 200 may use the instruction cache 102 to provide instructions to one or more execution units (not shown).

The program counter 270 may identify an instruction to be executed. The program counter 270 may include an index portion 272 and a tag portion 274 associated with the instruction to be executed. Each time an instruction is executed, the program counter 270 may be adjusted (e.g., incremented) to identify a next instruction to be executed. The index portion 272 of the next instruction to be executed may be provided to the data array 110 and may identify an index (e.g., a row including multiple cache lines) of the data array 110 associated with the next instruction to be executed. The tag portion 274 may be provided to a tag array 280 of the instruction cache 102. The tag array 280 may use the tag portion 274 to identify a column (e.g., a way) of the data array associated with the next instruction to be executed. Accordingly, a combination of the index portion 272 and the tag portion 274 may uniquely identify a particular cache line of the data array 110 storing the next instruction to be executed. In a particular embodiment, the program counter 270 may also provide the index portion 272, the tag portion 274, or a combination thereof to the control logic 150.

The instruction cache 102 may include the data array 110, a multiplexer 260, the control logic 150, and the tag array 280. The data array 110 may include a plurality of ways (e.g., four (4) ways), such as a first way, a second way, a third way, and a fourth way as depicted in FIG. 2 for a particular row of a plurality of rows of the data cache. Each of the ways may be associated with a corresponding cache line 220a-d of the instruction cache 102. The plurality of ways may be accessed during execution of a program (executed by the processor system 200 as a series of instructions). Each of the plurality of ways may include a driver 240a-d (e.g., a line driver) and a data line 230a-d that corresponds to cache lines of the data array 110. For example, the first way may be associated with a cache line A 220a and include a first driver 240a and a first data line 230a, the second way may be associated with a cache line B 220b and include a second driver 240b and a second data line 230b, the third way may be associated with a cache line C 220c and include a third driver 240c and a third data line 230c, and the fourth way may be associated with a cache line D 220d and include a fourth driver 240d and a fourth data line 230d.

Each driver 240a-d may enable data (e.g., one or more instructions) stored in a corresponding cache line 220a-d to be read (e.g., driven) from the data array 110 via a corresponding data line 230a-d. The data may be provided as an output of the data array 110. For example, the drivers 240a-d may correspond to the drivers 140-144 of FIG. 1. The data array 110 may include a set-associative instruction cache data array. In a particular embodiment, the data array 110 is a four-way set associative cache.

The control logic 150 may set a value of the prediction mask 152. The value set for the prediction mask 152 may correspond to a particular cache line 220a-d of the data array 110 that was last accessed. The value of the prediction mask 152 may predict (e.g., identify) a "next way" (e.g., a subsequent way) with respect to the particular cache line 220a-d that was last fetched. For example, the value set for the prediction mask 152 may correspond to the cache line A 220a. The prediction mask 152 of FIG. 2 may include four (4) bits, where each bit corresponds to a different way, and thus a different driver 240a-d, respectively. For example, from left to right, a first bit (e.g., a most significant bit) may correspond to the first way, a second bit may correspond to the second way, and so on. The prediction mask 152 may indicate, based on one or more bits being set (e.g., asserted to a logical one (1) value), one or more drivers 240a-d that are to be enabled. For example, a subset of the drivers 240a-d (e.g., a subset of line drivers) may be enabled (responsive to the prediction mask 152 being applied to the data array 110) to provide content (e.g., data, such as one or more instructions stored in the corresponding cache lines 220a-d) to the multiplexer 260.

Each cache line 220a-d may be associated with a corresponding prediction mask value (e.g., a corresponding multi-bit prediction mask value). The corresponding prediction mask value for a particular cache line (e.g., one of the cache lines 220a-d) may be set as the value of a portion of the prediction mask 152 based on the particular cache line being accessed. For example, when the particular cache line is accessed, the prediction mask value corresponding to the particular cache line may be identified and set as the value of a portion of the prediction mask 152 to identify one or more "predicted" ways to be driven after the particular cache line.

The corresponding prediction mask values may be stored in any structure that has a one-to-one association with the cache lines of the instruction cache 102. For example, one or more of the corresponding prediction mask values may be stored in a tag array (e.g., the tag array 280), a register associated with (e.g., corresponding to) the cache line 220a-d, or as part of (e.g., at the end of) a cache line. In a particular exemplary embodiment, the cache line A 220a of the data array 110 includes cache line A contents 222 (e.g., one or more stored instructions) and a cache line A prediction mask value 254 (e.g., a corresponding prediction mask value). Based on the cache line A 220a being accessed (e.g., fetched), the control logic 150 may select the cache line A prediction mask value 254 and set the value of the prediction mask 152 to the cache line A prediction mask value 254. The control logic 150 may maintain and update the cache line A prediction mask value 254 as one or more mispredictions occur or as contents are loaded into or fetched from the data array 110. Although the cache line A prediction mask value 254 is shown as being stored as part of the cache line A 220a, it may be appreciated that the cache line A prediction mask value 254 may be stored as part of the tag array 280 or as part of a register associated with the cache line A 220a.

When the processor system 200 is powered on, the control logic 150 may initialize the value of the prediction mask 152 to an initial value (e.g., a zero (0) value such as "0000"). The control logic 150 may also initialize each prediction mask value to the initial value. For example, upon a power-up of the processor system 200, the control logic 150 may initialize the cache line A prediction mask value 254 to the initial value. In a particular embodiment, when the prediction mask 152 includes all zero values, there is no prediction and no drivers 240a-d are driven (e.g., enabled) subsequent to a fetch of cache line A 220a. In an alternative embodiment, all drivers 240a-d are driven when the prediction mask 152 includes all zero values.

The control logic 150 may also initialize a particular prediction mask value when contents are loaded (e.g., a cache line fill) into a cache line corresponding to the particular prediction mask. For example, the control logic 150 may set the cache line A prediction mask value 254 to the initial value of "0000" when one or more instructions are loaded (e.g., stored) at the cache line A 220a.

The control logic 150 may periodically set one or more prediction mask values to the initial value. For example, the control logic 150 may also re-set (e.g., initialize to a zero value) one or more prediction mask values after a time period expires (e.g., an expiration of the time period) or after a number of cache access operations. In a particular embodiment, each prediction mask value may be associated with a corresponding time period, a corresponding number of cache access operations, or a combination thereof. In another particular embodiment, the entire data array 110 may be associated with a corresponding time period, a corresponding number of cache access operations, or a combination thereof. For example, the number of cache access operations may be associated with a number of cache operations (e.g., cache access operations, such as a cache load, a cache fetch, or a combination thereof) of the data array 110, of a particular row of the data array 110, or of a particular cache line 220a-d. In a particular embodiment, the time period and/or the number of cache operations may be tracked by the control logic 150. When contents are loaded into a particular cache line, the corresponding prediction mask value of the particular cache line may be set to the initial value, and all other prediction mask values that identify a way corresponding to the particular cache line as a successor cache line may be updated. For example, when the cache line A prediction mask value 254 is "0001" (e.g., which indicates that the fourth way associated with the cache line D 220d is a successor way) and contents (e.g., new contents) are loaded into the cache line D 220d, a cache line D prediction mask value may be set to the initial value and the cache line A prediction mask value 254 may be set to "0000" indicating that a way corresponding to the new contents of the cache line D 220d has not been predicted as a "next way prediction" after execution of the cache line A 220a.

After contents are loaded into a particular cache line and the corresponding prediction mask value is set to the initial value, the control logic 150 may determine (e.g., identify) which way is accessed next (e.g., subsequent to the particular cache line as a successor way). Upon determining the successor way, the control logic 150 may set a bit of the corresponding prediction mask value to identify the successor way.

For example, when the contents (e.g., one or more instructions) are loaded into the cache line A 220a of the data array 110 (and the cache line A prediction mask value 254 is initialized to "0000"), the control logic 150 may determine which way is accessed. When a way corresponding to the cache line D 220d is identified as the successor to cache line A 220a, the control logic 150 may set the cache line A prediction mask value 254 to "0001." Accordingly, when the cache line A is accessed and the cache line A prediction mask value 254 is set as the value of the prediction mask 152, the driver 240d may be selectively enabled to drive contents of the fourth way (e.g., cache line D 220d) in anticipation of cache line D 220d being accessed after the cache line A 220a. The bit corresponding to the fourth way of the cache line A prediction mask value 254 may remain asserted until the contents (e.g., data) of cache line D 220d are replaced (e.g., evicted or removed) or until the cache line A prediction mask value 254 is re-set to the initial value. Alternatively, the bit corresponding to the fourth way may remain asserted until the contents (e.g., data) of cache line D 220d are invalidated.

The control logic 150 may also determine (e.g., detect) whether a misprediction occurs as a result of the prediction mask 152 being applied to the data array 110. For example, when the prediction mask 152 is set to a value of a particular prediction mask value corresponding to a particular cache line 220a-d of the data array 110, the control logic 150 may determine whether the particular prediction mask value resulted in a misprediction. When the particular prediction mask value resulted in the misprediction, the control logic 150 may identify the correct way to be driven (e.g., the correct driver to be enabled) and update the particular prediction mask value based on the identified correct way.

For example, when the prediction mask 152 is set to the cache line A prediction mask value 254 of "0001", the driver 240d associated with the fourth way may be selectively enabled to drive the contents of the cache line D 220d to the multiplexer 260. When the control logic 150 determines that a misprediction occurred based on the fourth way being driven to the multiplexer 260, the control logic 150 may identify the correct way to be driven and update the cache line A prediction mask value 254. For example, the control logic 150 may provide a signal to the multiplexer that identifies the correct way to be driven or that identifies one or more ways that were not driven when the misprediction occurred. In a particular embodiment, the third way corresponding to the cache line C 220c is identified by the control logic 150 as the correct way and the control logic 150 updates the cache line A prediction mask value 254 to "0011" reflecting the determination that the third way associated with the cache line C 220c is also a successor to the cache line A 220a.

The multiplexer 260 may select one of the outputs of the data array 110 to be provided as an output of the instruction cache 102. The output of the instruction cache 102 may be provided to an execution unit (not shown) associated with the processor system 200. The multiplexer 260 may be configured to receive a way select signal as an output of the tag array 280. Based on the way select signal, the multiplexer 260 may select one of the outputs of the data array 110 to be provided as the output of the multiplexer 260 (e.g., the output of the instruction cache 102).

The program counter 270 may provide the tag portion 274 (associated with an instruction to be executed next) to the tag array 280. In a particular embodiment, the tag portion 274 may be provided to the tag array 280 in parallel with the control logic 150 applying the prediction mask 152 (associated with an instruction currently being executed) that predicts one or more ways that may be associated with an instruction to be executed next. In another particular embodiment, the tag portion 274 may be provided to the tag array 280 after (e.g., in response to) a misprediction. The tag array 280 may identify the location (e.g., a cache line or way) in the data array 110 that includes the instruction to be executed next. The tag array 280 may provide the location to the multiplexer 160 as the way select signal. When the prediction mask 152 results in more than one way of the data array 110 being driven to the multiplexer 260, the multiplexer may select a particular way based on the way select signal received from the tag array 280. In the event that the prediction mask 152 did not enable a particular line driver corresponding to the way identified by the way selection signal, the control logic 150 may determine that a misprediction occurred. To recover (e.g., correct) from the misprediction, all of the drivers 240a-d may be enabled and the multiplexer 260 may select the correct way to be provided to the execution unit. In an alternative embodiment, the tag array 280 may provide the way select signal to the control logic 150 and the multiplexer 260. In the event of a misprediction, the control logic 150 may recover from the misprediction by enabling a single driver 240a-d based on the way select signal. The control logic 150 may provide an indication of the correct way to the multiplexer 260.

During operation, a particular instruction is fetched from a particular cache line 220a-d of the data array 110 and executed (by an execution unit). Based on the particular instruction being fetched and/or executed, the control logic 150 identifies a prediction mask value corresponding to the particular cache line. The control logic 150 may set the prediction mask 152 to the prediction mask value to selectively enable one or more drivers 240a-d of the data array 110. When the one or more drivers 240a-d are enabled, contents of selected cache lines (e.g., one or more of the cache lines 220a-d) corresponding to the one or more enabled drivers (e.g., one or more of the drivers 240a-d) may be provided to the multiplexer 260.

In parallel with the prediction mask 152 being applied, the program counter 270 may provide the tag portion 274 (associated with an instruction to be executed next) to the tag array 280. Based on the tag portion 274, the tag array 280 may determine a location (e.g., a way and/or a cache line) of contents of the data array 110 to be accessed after the particular instruction. The tag array 280 may provide the location to the multiplexer 260 as the way select signal.

The multiplexer 260 may receive the way select signal and the contents of the selected cache lines (e.g., one or more of the cache lines 220a-d) corresponding to the one or more drivers (e.g., one or more of the drivers 240a-d) enabled based on the prediction mask 152. When the way identified by the way selection signal is provided to the multiplexer 260, the multiplexer 260 selects the identified way and provides the way as the output of the multiplexer 260. Alternatively, when the way identified by the way selection signal is not provided to the multiplexer 260, the control logic 150 determines that a misprediction occurred and enables one or more drivers 240a-d to provide the correct way to the multiplexer 260.

By selectively enabling a subset of the plurality of drivers 240a-d and driving more than one predicted way (but not all of the ways), a power benefit may be realized on each data access of the instruction cache 102. Additionally, the processor system 200 may maintain and update the prediction mask value for each cache line 220a-d of the data array 110.

Figure 3:
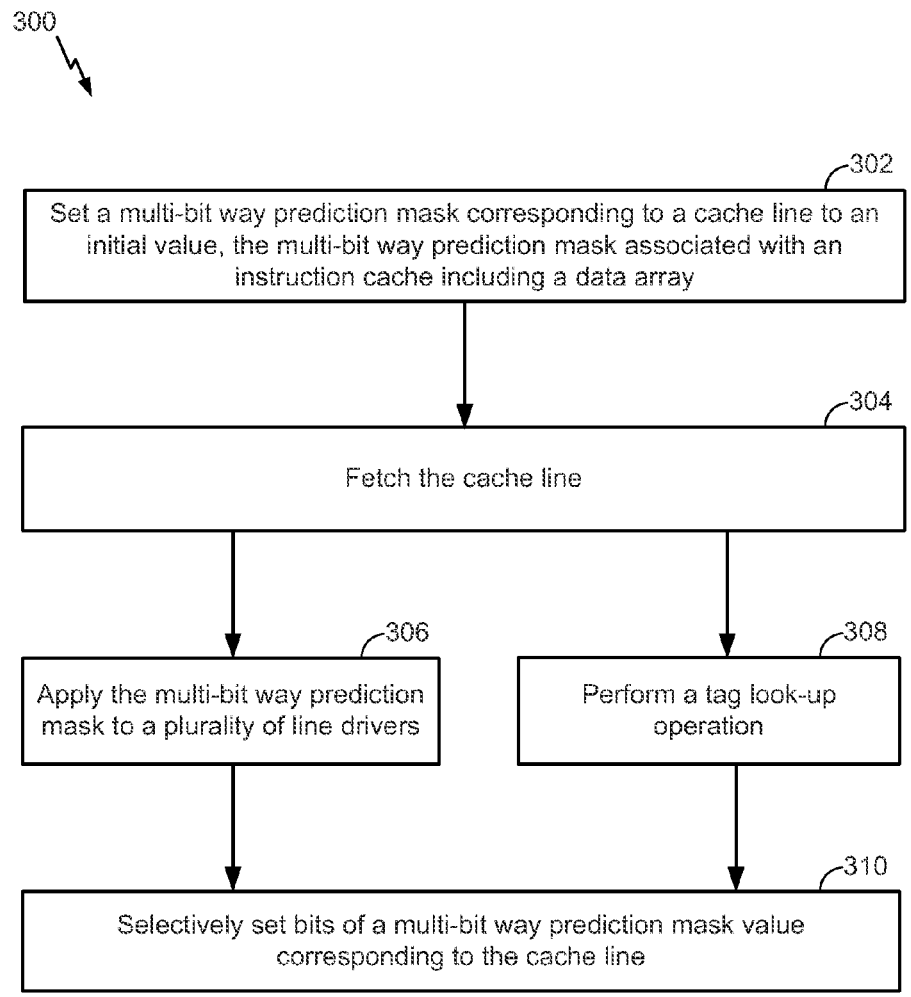
FIG. 3 is a flow diagram of a first illustrative embodiment of a method to perform way prediction.

Referring to FIG. 3, a flow diagram of a first illustrative embodiment of a method 300 to perform way prediction associated with an instruction cache is illustrated. For example, the instruction cache may include the instruction cache 102 of FIG. 1. In a particular embodiment, the method 300 may be performed by the control logic 150 of FIG. 1.

A multi-bit way prediction mask corresponding to a cache line may be set to an initial value, at 302, and the cache line may be fetched, at 304. The multi-bit way prediction mask may be associated with an instruction cache including a data array having a plurality of cache lines. The value of the multi-bit way prediction mask may correspond to a cache line included in the data array of the instruction cache. For example, the multi-bit prediction mask may be the prediction mask 152 and the data array may be the data array 110 of FIG. 1.

The multi-bit way prediction mask may be applied to a plurality of line drivers, at 306. A subset of line drivers of the plurality of line drivers of the data array may be enabled responsive to the multi-bit way prediction mask. In a particular embodiment, the subset may include multiple line drivers (e.g., the prediction mask has multiple bits set and concurrently enables multiple line drivers). For example, the plurality of line drivers may include the line drivers 140-144 of FIG. 1 or the line drivers 240a-d of FIG. 2. The multi-bit way prediction mask may be set to a value (e.g., a multi-bit prediction mask value corresponding to the cache line) that is stored in the data array as part of the cache line.

A tag look-up operation may be performed, at 308. In a particular embodiment, the tag look-up operation, at 308, may be performed in parallel (e.g., concurrently or at least partially overlapping) with the multi-bit way prediction mask being applied to the plurality of line drivers, at 306. For example, a tag look-up operation may be performed using the tag array 280 of the instruction cache 102 of FIG. 2.

Bits of a multi-bit way prediction mask value corresponding to the cache line may be selectively set, at 310. For example, one or more bits of the multi-bit way prediction mask value may be set to update the multi-bit way prediction mask value. The one or more bits of the multi-bit way prediction mask value may be updated based on one or more operations that access (e.g., load data or fetch data) from the data array, as described further with reference to FIG. 4. The updated multi-bit way prediction mask value (e.g., the set bits) may be stored in any structure that can provide a one-to-one association with the plurality cache lines of the instruction cache. For example, the updated multi-bit way prediction mask value (e.g., the set bits) may be stored in a tag array, a register associated with (e.g., corresponding to) the cache line, or as part of (e.g., at the end of or the beginning of) the cache line.

One or more bits of the multi-bit way prediction mask value corresponding to the cache line may be selectively set based on a cache line load operation or a cache line fetch operation. For example, when a misprediction results, the multi-bit way prediction mask value may be updated based on an identified successor way (e.g., a correct way) that is accessed after the cache line corresponding to the multi-bit way prediction mask is accessed. As another example, when data is loaded into the cache line, the multi-bit way prediction mask value corresponding to the cache line may be set to an initial value. Further, when data is loaded into the cache line, one or more other multi-bit way prediction mask values that each correspond to different cache lines may be updated. For example, when another multi-bit way prediction mask value corresponding to another cache line identifies a way associated with the cache line as a successor way and the contents of the identified cache line are modified, the other multi-bit way prediction mask corresponding to the other cache line may be updated (e.g., one or more bits may be selectively set) to indicate that the way associated with the cache line is no longer identified as (e.g., predicted to be) a successive way based on the data being loaded into the cache line.

In accordance with the method 300, when a subset of line drivers is selectively enabled, one or more predicated ways (but not all ways) may be driven and a power benefit may be realized during a data access of the instruction cache. Additionally, using the way prediction technique described above, a misprediction (e.g., a successor way not being identified by the multi-bit way prediction mask 152) for the way should only occur once because after the misprediction, a bit of the prediction mask value corresponding to the cache line is set (e.g., updated) to identify the successor way. The updated multi-bit way prediction mask value may be stored for use (e.g., to predict one or more ways) after a next (e.g., subsequent) access of the cache line.

Figure 4:
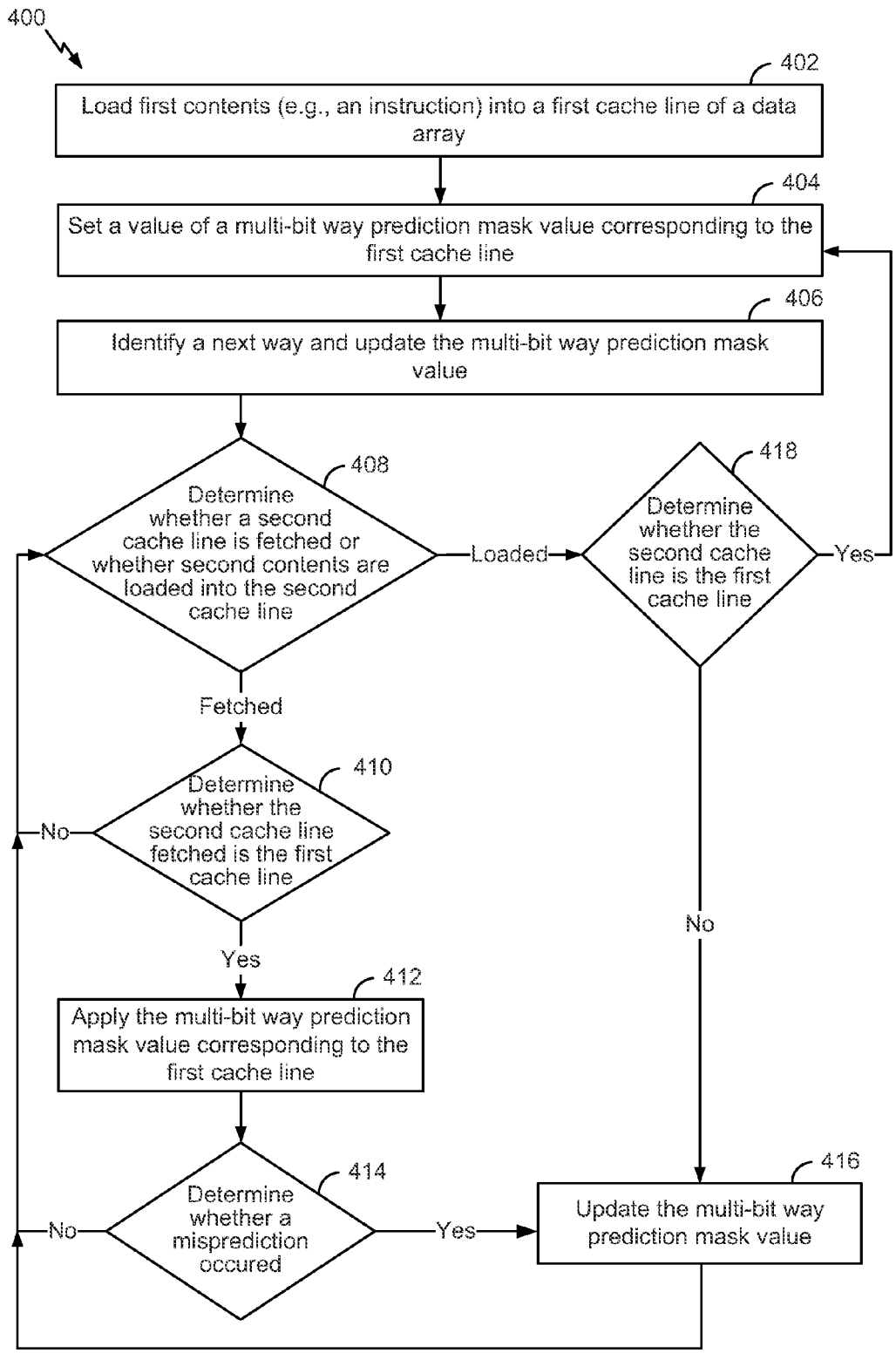
FIG. 4 is a flow diagram of a second illustrative embodiment of a method to perform way prediction.

Referring to FIG. 4, a flow diagram of another illustrative embodiment of a method 400 to perform way prediction associated with an instruction cache is illustrated. The method 400 may also monitor one or more operations performed on the instruction cache and maintain a prediction mask value corresponding to a first cache line of the instruction cache. For example, the instruction cache may include the instruction cache 102 of FIG. 1. In a particular embodiment, the method 400 may be performed by the control logic 150 of FIG. 1.

First contents may be loaded into the first cache line of a data array, at 402, and a multi-bit way prediction mask value corresponding to the first cache line may be set, at 404. Upon loading data into the first cache line of the data array, the multi-bit way prediction mask value corresponding to the first cache line may be set to an initial value. For example, the first cache line may include one of the first cache lines 220a-d of FIG. 2. In a particular embodiment, the first contents may be loaded into the cache line A 220a and the cache line A prediction mask value 254 may be set to an initial value.

A next way may be identified and the multi-bit way prediction mask value may be updated, at 406. The next way may be a successor way (e.g., a successive cache line) to the first cache line and the multi-bit way prediction mask value corresponding to the first cache line may be updated to indicate the identified next way as the successor way. The next way may correspond to a particular cache line accessed (e.g., having contents fetched from or loaded into) after the first contents are loaded into the first cache line of the data array.

After loading the first contents and updating the multi-bit way prediction mask value corresponding to the first cache line, at 402-406, subsequent accesses to the cache may be monitored to determine whether the first contents and the multi-bit way predication mask value corresponding to the first cache line are affected. For example, when a subsequent access is made to a second cache line, a determination whether the second cache line is fetched or whether second contents are loaded into the second cache line may be made, at 408. For example, the control logic 150 of FIG. 1 may monitor the data array 100 by making such a determination each time the data array 110 is accessed. When the second contents are determined to have been loaded into the second cache line, processing advances to 418, where a determination of whether the second cache line fetched is the first cache line is made. When the second cache line is determined, at 418, to be the first cache line, the contents of the first cache line have been modified and the predicted next way(s) following the first cache line is likely no longer valid. Accordingly, processing advances to 404, where the multi-bit way prediction mask value is set. For example, the multi-bit way prediction mask value may be set to the initial value based on the second contents being loaded into and replacing the first contents of the first cache line. In a particular embodiment, setting the value of the multi-bit way prediction mask value includes setting the multi-bit way prediction mask value to an initial value (e.g., a zero value).

Alternatively, when the second cache line is instead determined, at 418, not to be the first cache line of the array, processing advances to 416, where the multi-bit way prediction mask value of the first cache line and/or the second cache line may be updated. A particular prediction mask value corresponding to the second cache line is set to the initial value and the prediction mask value of the cache may be updated based on (e.g., to reflect) the second contents being loaded into the second cache line. For example, the multi-bit way prediction mask corresponding to the first cache line may be updated when the multi-bit way prediction mask value corresponding to the first cache line includes an asserted bit that indicates the way corresponding to the second cache line is a predicted way (e.g., a subsequent way after the first cache line is accessed). When the multi-bit way prediction mask corresponding to the first cache line includes the asserted bit, the multi-bit way predication mask corresponding to the first cache line may be updated by de-asserting (e.g., setting to a logical zero value) the asserted bit. Accordingly, a particular bit value (e.g., associated with a way that corresponds to the second cache line) of the multi-bit way prediction mask value corresponding to the first cache line remains set until the contents of the second cache line are removed from the instruction cache (e.g., removed from a cache line location). After the multi-bit way prediction mask is updated, the method 400 advances to 408. In an alternative embodiment, the value of the multi-bit way prediction mask value corresponding to the first cache line is not updated when the second cache line is determined not to be the first cache line. Rather, when the second cache line is determined, at 418, not to be the first cache line, processing advances to 408, and the multi-bit predication mask value corresponding to the first cache line is not updated based on data (e.g., the second contents) being loaded into the second cache line.

When the second cache line is instead determined, at 408, to have been fetched (e.g., accessed), processing advances to 410, where a determination whether the second cache line is the first cache line is made. When the second cache line is determined, at 410, to not be the first cache line, processing advances to 408. In a particular embodiment, a particular prediction mask value corresponding to the second cache line is provided to the data array.

Alternatively, when the second cache line is determined, at 410, to be the first cache line, the prediction mask value of the first cache line is applied (e.g., provided) to the data array, at 412. The multi-bit way prediction mask value may be set as a value of a prediction mask that is applied (e.g., provided) to a data array including a plurality of line drivers. Application of the prediction mask to the data array (e.g., the plurality of line drivers) selectively drives one or more ways that are predicted to be a "next way" accessed after the first cache line is fetched (e.g., accessed). When the correct "next way" to be accessed is not included in the one or more ways predicted to be the "next way," a misprediction occurs. For example, referring to FIG. 2, the cache line A prediction mask value 254 may be set as the value of the prediction mask 152. In a particular embodiment, the multi-bit way prediction mask value corresponding to the first cache line is applied to the plurality of line drivers of the data array after the first cache line is fetched (e.g., accessed). For example, applying the multi-bit way prediction mask to the plurality of line drivers of the data array may include the prediction mask 152 being applied to the line drivers 140-144 of FIG. 1 or to the line drivers 240*a-d* of FIG. 2. After the multi-bit way prediction mask is applied, the method 400 advances to 414.

At 414, a determination is made whether a misprediction occurred. The misprediction may occur when the "next way" was not driven as a result of the prediction mask being applied to the data array to selectively enable one or more drivers of the data array. For example, the determination may be made by the control logic 150 of FIG. 1. When the misprediction is determined to have occurred, processing advances to 416, where the multi-bit way prediction mask value is updated. After the misprediction, one or more line drivers of the data array may be enabled. In a particular embodiment, all of the line drivers are enabled. In another particular embodiment, a single line driver is enabled. In another particular embodiment, the one or more line drivers that are enabled do not include the line drivers previously enabled that resulted in the misprediction. A successor way may then be selected from the data array based on a completed tag look-up operation to identify a correct way (e.g., a correct cache line) to be driven after the first cache line has been accessed. The control logic may determine (e.g., identify) the successor way driven after the misprediction and update the multi-bit prediction mask value of the first cache line based on the successor way. Accordingly, the prediction mask value may be updated based on identification of the successor way (e.g., the correct way) that was driven after an application of the prediction mask resulted in a misprediction (e.g., the correct way not being driven). When the misprediction is determined to have not occurred, processing advances to 408.

In accordance with the method 400, a multi-bit way prediction mask value for the first cache line may be maintained and updated. The multi-bit prediction mask value may be provided to the data array of the instruction cache as a prediction mask to selectively enable one or more line drivers of the instruction cache. Selectively enabling (or disabling) the one or more line drivers may operate to drive one or more predicted "next ways" to be driven after the first cache line is accessed. The multi-bit prediction mask value may be updated based on whether a load operation or a fetch operation is performed on the second cache line of the data array and/or whether the second cache line is the first cache line. By maintaining and updating the multi-bit way prediction mask value to selectively enable less than all of the line drivers of the instruction cache may affect power efficiency and processor performance.

Figure 5:
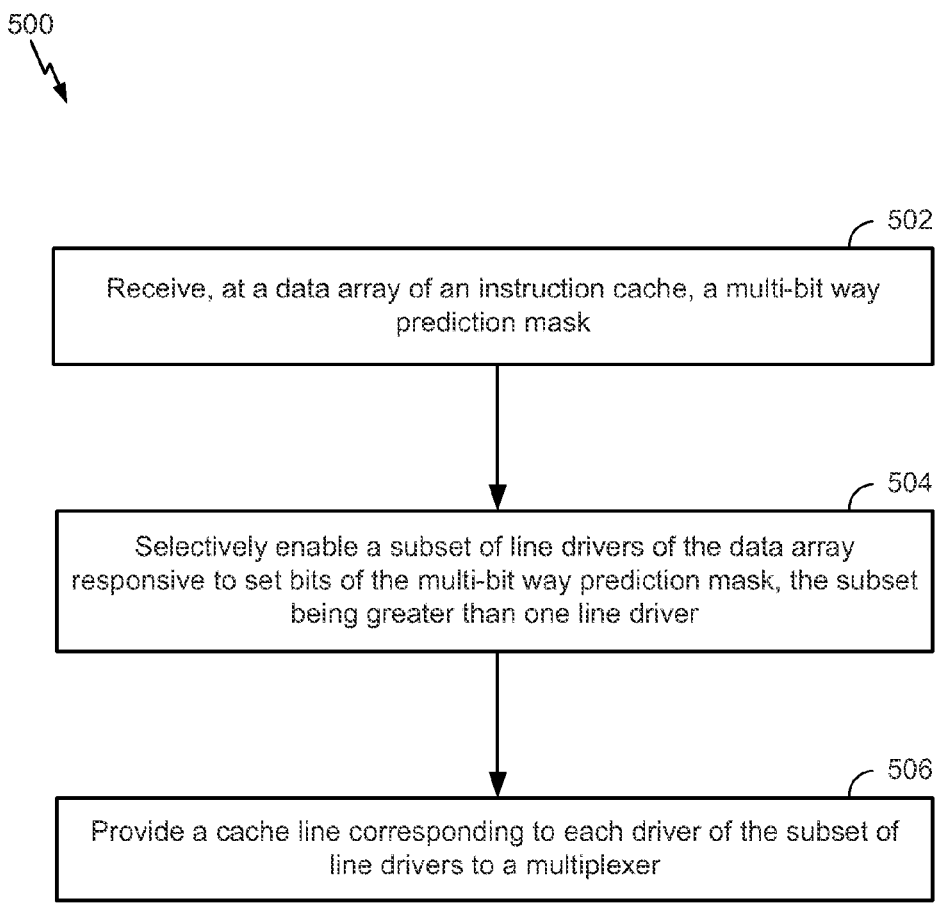
FIG. 5 is a flow diagram of a third illustrative embodiment of a method to perform way prediction.

Referring to FIG. 5, a flow diagram of a third illustrative embodiment of a method 500 to perform way prediction associated with an instruction cache is illustrated. For example, the instruction cache may include the instruction cache 102 of FIG. 1. In a particular embodiment, the method 500 may be performed by the control logic 150 of FIG. 1.

A multi-bit way prediction mask may be received at a data array of an instruction cache, at 502. For example, the multi-bit way prediction mask may be the multi-bit way prediction mask 152 and the data array may be the data array 110 of FIG. 1. A value of the multi-bit way prediction mask may be stored in a tag array, a register, or as part of the cache line of the instruction cache to which the multi-bit way prediction mask corresponds. In a particular embodiment, the value of the multi-bit way prediction mask is received from the tag array, the register, or the cache line of the instruction cache via control logic of the instruction cache.

A subset of line drivers of the data array may be selectively enabled responsive to the set bits of the multi-bit way prediction mask, at 504. One or more line drivers may be selectively enabled (e.g., turned on or activated) or selectively disabled (e.g., turned off or deactivated) by a different bit of the prediction mask. In a particular embodiment, each asserted bit of the prediction mask causes a corresponding driver to be activated (e.g., turned on) to drive a cache line (e.g., contents of the cache line) to a multiplexer. The subset may be greater than a single line driver. For example, the subset may include multiple line drivers (e.g., a plurality of line drivers). The subset of line drivers may be included in a plurality of line drivers, such as the line drivers 140-144 of FIG. 1 or the line drivers 240a-d of FIG. 2.

A cache line corresponding to each driver of the subset of line drivers may be provided to a multiplexer, at 506. For example, a cache line corresponding to each enabled line driver of the subset of line drivers may be provided to the multiplexer. A determination may be made whether a misprediction occurred (e.g., whether a correct way was not driven to the multiplexer) based on the multi-bit way prediction mask. For example, control logic may identify (e.g., detect) whether or not the multiplexer selected one of the driven ways (e.g., contents, such as one or more instructions, of one or more cache lines) provided to the multiplexer. When a determination is made that the misprediction occurred, all of the line drivers may be enabled and the correct way may be selected based on a completed tag look-up operation. The tag look-up operation may have been performed concurrently (e.g., in parallel) with the multi-bit way prediction mask being provided to the plurality of line drivers to selectively enable the subset of line drivers. Additionally or alternatively, the tag look-up operation may be performed concurrently with one or more of the line drivers being selectively enabled (or disabled).

Figure 6:
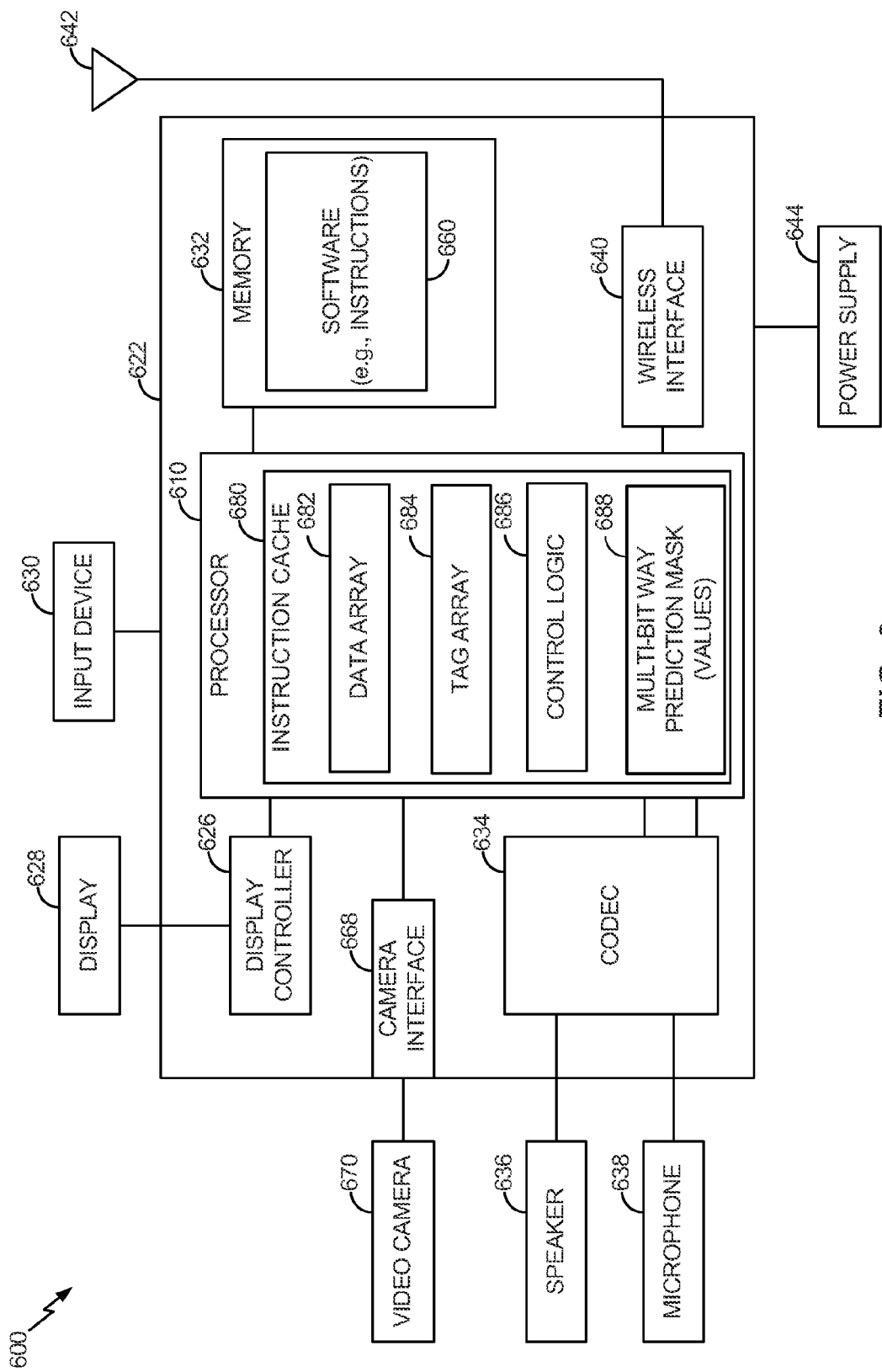
FIG. 6 is a block diagram of a particular embodiment of a wireless communication device including an instruction cache memory system to perform way prediction.

FIG. 6 is a block diagram of a particular embodiment of a device 600 (e.g., a communication device) including an instruction cache memory system that utilizes a multi-bit way prediction mask. The device 600 may be a wireless electronic device and may include a processor 610, such as a digital signal processor (DSP), coupled to a memory 632.

The processor 610 may be configured to execute software 660 (e.g., a program of one or more instructions) stored in the memory 632. The processor 610 may include an instruction cache 680. For example, the instruction cache 680 may include or correspond to the instruction cache 102 of FIG. 1. The instruction cache 680 may include a data array 682, a tag array 684, control logic 686, and a multi-bit way prediction mask 688. The data array 682, the control logic 686, and the multi-bit way prediction mask 688 may correspond to the data array 110, the control logic 150, and the prediction mask 152 of FIG. 1, respectively. The data array 682 may include a plurality of line drivers, such as the line drivers 140-144 of FIG. 1 or the line drivers 240a-d of FIG. 2. The tag array 684 may correspond to the tag array 280 of FIG. 2. In an illustrative example, the processor 610 includes or corresponds to any of the systems of FIGS. 1-2, or components thereof, and operates in accordance with any of the embodiments of FIGS. 3-5, or any combination thereof. For example, as shown in FIG. 2, the control logic 686 may set a value of the multi-bit way prediction mask 688 that is applied to the data array 682 to enable a predicted way to be provided as an output of the data array 682. In a particular embodiment, a subset of the plurality of line drivers is enabled based on the multi-bit way prediction mask, where the subset includes multiple line drivers. The tag array 684 may perform a tag look-up operation to identify a correct way to be driven in the event that a misprediction occurred based on the multi-bit way prediction mask 688 being applied. In a particular embodiment, the processor 610 may be configured to execute computer executable instructions (e.g., the software 660) stored at a non-transitory computer-readable medium, such as the memory 632, that are executable to cause a computer, such as the processor 610, to selectively set bits of a multi-bit way prediction mask according to a prediction mask value. The multi-bit way prediction mask is associated with an instruction cache including a data array. A subset of line drivers of the data array is enabled responsive to the multi-bit way prediction mask. In a particular embodiment, the subset of line drivers is a single line driver. In another particular embodiment, the subset of line drivers is greater than one line driver (e.g., multiple line drivers). The computer executable instructions (e.g., the software 660) may further cause the processor 610 to receive the prediction mask value and selectively enable the multiple line drivers.

A camera interface 668 is coupled to the processor 610 and is also coupled to a camera, such as a video camera 670. A display controller 626 is coupled to the processor 610 and to a display device 628. A coder/decoder (CODEC) 634 can also be coupled to the processor 610. A speaker 636 and a microphone 638 can be coupled to the CODEC 634. A wireless interface 640 can be coupled to the processor 610 and to an antenna 642 such that wireless data received via the antenna 642 and the wireless interface 640 can be provided to the processor 610.

In a particular embodiment, the processor 610, the display controller 626, the memory 632, the CODEC 634, the wireless interface 640, and the camera interface 668 are included in a system-in-package or system-on-chip device 622. In a particular embodiment, an input device 630 and a power supply 644 are coupled to the system-on-chip device 622. Moreover, in a particular embodiment, as illustrated in FIG. 6, the display device 628, the input device 630, the speaker 636, the microphone 638, the wireless antenna 642, the video camera 670, and the power supply 644 are external to the system-on-chip device 622. However, each of the display device 628, the input device 630, the speaker 636, the microphone 638, the wireless antenna 642, the video camera 670, and the power supply 644 can be coupled to a component of the system-on-chip device 622, such as an interface or a controller.

The methods 300-500 of FIGS. 3-5 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 300 of FIG. 3, the method 400 of FIG. 4, the method 500 of FIG. 5, or any combination thereof, can be initiated by a processor that executes instructions stored in the memory 632, as described with respect to FIG. 6.

In conjunction with one or more of the described embodiments, an apparatus is disclosed that may include means for selectively setting bits of a multi-bit way prediction mask associated with an instruction cache including a data array. The means for selectively setting bits may include the control logic 150 of FIGS. 1-2, the processor 610, the control logic 686 of FIG. 6, one or more other devices or circuits configured to selectively set bits of the multi-bit way prediction mask, or any combination thereof.

The apparatus may also include means for providing the multi-bit way prediction mask to a plurality of line drivers of the data array. The means for providing may include the control logic 150 of FIGS. 1-2, the processor 610, the control logic 686 of FIG. 6, one or more other devices or circuits configured to provide the multi-bit way prediction mask, or any combination thereof.

The apparatus may also include means for selecting a particular way from a plurality of ways driven after enabling the multiple line drivers. The means for selecting may include the control logic 150, the prediction mask 152 of FIGS. 1-2, the multiplexer 260, the tag array 280 of FIG. 2, the processor 610, the control logic 686, the multi-bit way prediction mask 688, the tag array 688 of FIG. 6, one or more other devices or circuits configured to select a particular way from a plurality of ways driven, or any combination thereof.

The apparatus may also include means for outputting an indication of the particular way. The means for outputting the indication of the particular way may include the control logic 150 of FIG. 1, the tag array 280 of FIG. 2, the tag array 684, the control logic 686 of FIG. 6, one or more other devices or circuits configured to output an indication of the particular way, or any combination thereof.

The apparatus may also include means for outputting data read from the particular way. The means for outputting data read from the particular way may include the line drivers 140-144 of FIG. 1, the line drivers 240a-d, the multiplexer 260 of FIG. 2, one or more other devices or circuits configured to output data read from the particular way, or any combination thereof.

One or more of the disclosed embodiments may be implemented in a system or an apparatus, such as the device 600, that may include a communications device, a fixed location data unit, a mobile location data unit, a mobile phone, a cellular phone, a computer, a tablet, a portable computer, or a desktop computer. Additionally, the device 600 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-6 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

Those of skill would further appreciate that the various illustrative logical blocks, configurations, modules, circuits, and algorithm steps described in connection with the embodiments disclosed herein may be implemented as electronic hardware, computer software executed by a processor, or a combination thereof. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An illustrative storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
an instruction cache including a data array;
control logic configured to selectively set bits of a multi-bit way prediction mask based on a prediction mask value, the control logic associated with the instruction cache, wherein a value of each bit of the prediction mask value indicates whether a corresponding way is to be enabled, and
wherein a subset of line drivers of the data array is enabled responsive to the multi-bit way prediction mask, the subset of line drivers including multiple line drivers.

2. The apparatus of claim 1, wherein a particular bit of the prediction mask value remains set until contents of a particular cache line corresponding to the particular bit is removed from the instruction cache.

3. The apparatus of claim 1, wherein the prediction mask value is initialized to an initial value upon a power-up.

4. The apparatus of claim 3, wherein each bit of the prediction mask value is set to a zero value.

5. The apparatus of claim 1, wherein the prediction mask value is periodically set to a particular value.

6. The apparatus of claim 3, wherein the prediction mask value is set to the initial value after expiration of a time period or after a number of cache access operations.

7. The apparatus of claim 1, further comprising a multiplexer configured to select data provided by a subset of a plurality of drivers responsive to a way select signal.

8. The apparatus of claim 1, wherein the data array includes a plurality of drivers coupled to a plurality of data lines, each of the plurality of drivers selectively enabled by a different bit of the multi-bit way prediction mask.

9. The apparatus of claim 1, wherein the prediction mask value is stored in a tag array, a register, or a cache line of the instruction cache.

10. The apparatus of claim 1, wherein the data array comprises a set-associative instruction cache data array.

11. A method of accessing a cache, the method comprising:
selectively setting bits of a multi-bit way prediction mask based on a prediction mask value, the multi-bit way prediction mask associated with an instruction cache including a data array having a plurality of line drivers, wherein a value of each bit of the prediction mask value indicates whether a corresponding way is to be enabled, and
wherein a subset of line drivers of the plurality of line drivers is enabled responsive to the multi-bit way prediction mask, the subset of line drivers including multiple line drivers.

12. The method of claim 11, further comprising updating the prediction mask value after an application of the multi-bit way prediction mask resulted in a misprediction, wherein the prediction mask value is updated to identify a particular way that was driven after the misprediction.

13. The method of claim 11, wherein the prediction mask value is stored in the data array as part of a cache line.

14. The method of claim 11, further comprising setting the multi-bit way prediction mask to the prediction mask value that corresponds to a cache line of the data array.

15. The method of claim 14, further comprising:
determining a successive cache line after the cache line is accessed; and
setting a bit of the prediction mask value based on the successive cache line, wherein the bit corresponds to the successive cache line.

16. The method of claim 14, further comprising providing the multi-bit way prediction mask having the prediction mask value to the line drivers after the cache line is fetched.

17. The method of claim 16, further comprising performing a tag look-up operation concurrently with providing the multi-bit way prediction mask.

18. The method of claim 11, further comprising determining whether contents of a particular cache line of the data array are replaced.

19. The method of claim 18, further comprising, when the contents of the particular cache line include the contents of the cache line, setting the prediction mask value to an initial value.

20. The method of claim 18, further comprising, when the particular cache line corresponds to an asserted bit of the prediction mask value, de-asserting the asserted bit of the prediction mask value.

21. An apparatus comprising:
means for selectively setting bits of a multi-bit way prediction mask based on a prediction mask value, the multi-bit way prediction mask associated with an instruction cache including a data array, wherein a value of each bit of the prediction mask value indicates whether a corresponding way is to be enabled; and
means for providing the multi-bit way prediction mask to a plurality of line drivers of the data array,
wherein a subset of line drivers of the plurality of line drivers are enabled responsive to the multi-bit way prediction mask, the subset of line drivers including multiple line drivers.

22. The apparatus of claim 21, further comprising:
means for selecting a particular way from a plurality of ways driven after enabling the multiple line drivers;
means for outputting an indication of the particular way; and
means for outputting data read from the particular way.

23. A non-transitory computer readable medium comprising instructions that when executed by a processor, cause the processor to:
selectively set bits of a multi-bit way prediction mask according to a prediction mask value, the multi-bit way prediction mask associated with an instruction cache including a data array having a plurality of line drivers, wherein a value of each bit of the prediction mask value indicates whether a corresponding way is to be enabled,
wherein a subset of line drivers of the plurality of line drivers are enabled responsive to the multi-bit way prediction mask, the subset of line drivers including multiple line drivers.

24. The non-transitory computer readable medium of claim 23, further comprising instructions that when executed by the processor, cause the processor to:
receive the prediction mask value; and
selectively enable each line driver of the subset of line drivers based on a corresponding bit of the multi-bit way prediction mask.

* * * * *